United States Patent
Karabinis

(10) Patent No.: US 7,899,002 B2
(45) Date of Patent: *Mar. 1, 2011

(54) SATELLITE/TERRESTRIAL WIRELESS COMMUNICATIONS SYSTEMS AND METHODS USING DISPARATE CHANNEL SEPARATION CODES

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 34 days.

This patent is subject to a terminal disclaimer.

(21) Appl. No.: 12/540,873

(22) Filed: Aug. 13, 2009

(65) Prior Publication Data

US 2009/0296628 A1 Dec. 3, 2009

Related U.S. Application Data

(63) Continuation of application No. 11/044,477, filed on Jan. 27, 2005, now Pat. No. 7,596,111.

(51) Int. Cl.
*H04B 7/185* (2006.01)

(52) U.S. Cl. ............... 370/316; 455/427; 455/63.1; 455/447; 455/13.4; 455/522; 455/12.1; 455/67.11; 370/466; 370/508

(58) Field of Classification Search ............... 455/427, 455/63.1, 12.1, 522, 13.3, 447, 3.01, 428; 370/466, 208, 316
See application file for complete search history.

(56) References Cited

U.S. PATENT DOCUMENTS

| 4,901,307 | A | 2/1990 | Gilhousen et al. |
| 5,073,900 | A | 12/1991 | Mallinckrodt |
| 5,303,286 | A | 4/1994 | Wiedeman |
| 5,339,330 | A | 8/1994 | Mallinckrodt |
| 5,394,561 | A | 2/1995 | Freeburg |
| 5,446,756 | A | 8/1995 | Mallinckrodt |

(Continued)

FOREIGN PATENT DOCUMENTS

EP 0 506 255 A2 9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner*—Marivelisse Santiago-Cordero
*Assistant Examiner*—Joseph Arevalo
(74) *Attorney, Agent, or Firm*—Myers Bigel Sibley & Sajovec, P.A.

(57) ABSTRACT

A wireless communications system includes a space-based component (SBC) and an ancillary terrestrial component (ATC) configured to communicate with radioterminals using a common satellite service link frequency band and respective first and second different sets of channel separation codes. The first and second sets of channel separation codes may include, for example, respective sets of scrambling codes, respective sets of frequency assignment codes, respective sets of channel assignment codes, respective sets of sub-channel assignment codes and/or respective sets of spreading codes.

66 Claims, 5 Drawing Sheets

U.S. PATENT DOCUMENTS

| | | | |
|---|---|---|---|
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,172,994 B1 | 1/2001 | Schaffner et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,532,220 B1 | 3/2003 | Carneal et al. |
| 6,556,828 B1 | 4/2003 | Carlin et al. |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,113,743 B2 | 9/2006 | Karabinis |
| 7,113,778 B2 | 9/2006 | Karabinis |
| 7,155,340 B2 | 12/2006 | Churan |
| 7,174,127 B2 | 2/2007 | Otten et al. |
| 7,181,161 B2 | 2/2007 | Karabinis |
| 7,203,490 B2 | 4/2007 | Karabinis |
| 7,218,931 B2 | 5/2007 | Karabinis |
| 7,295,807 B2 | 11/2007 | Karabinis |
| 7,340,213 B2 | 3/2008 | Karabinis et al. |
| 7,418,236 B2 | 8/2008 | Levin et al. |
| 7,418,263 B2 | 8/2008 | Dutta et al. |
| 7,421,342 B2 | 9/2008 | Churan |
| 7,437,123 B2 | 10/2008 | Karabinis et al. |
| 7,444,170 B2 | 10/2008 | Karabinis |
| 7,447,501 B2 | 11/2008 | Karabinis |
| 7,453,396 B2 | 11/2008 | Levin et al. |
| 7,454,175 B2 | 11/2008 | Karabinis |
| 7,457,269 B1 | 11/2008 | Grayson |
| 7,558,568 B2 | 7/2009 | Karabinis |
| 7,574,206 B2 | 8/2009 | Karabinis |
| 2001/0007552 A1 | 7/2001 | Schiff et al. |
| 2002/0090942 A1 | 7/2002 | Karabinis et al. |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054760 A1 | 3/2003 | Karabinis |
| 2003/0054761 A1 | 3/2003 | Karabinis |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0087606 A1 | 5/2003 | Dybdal et al. |
| 2003/0096574 A1 | 5/2003 | Anderson et al. |
| 2003/0137964 A1 | 7/2003 | Suenaga et al. |
| 2003/0149986 A1 | 8/2003 | Mayfield et al. |
| 2003/0153308 A1 | 8/2003 | Karabinis |
| 2003/0174686 A1 | 9/2003 | Willenegger et al. |
| 2004/0014452 A1 | 1/2004 | Lim et al. |
| 2004/0037311 A1 | 2/2004 | Willes et al. |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2004/0246998 A1 | 12/2004 | Ma et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Singh et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |

| | | | |
|---|---|---|---|
| 2005/0260947 A1 | 11/2005 | Karabinis et al. | |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0282542 A1 | 12/2005 | Karabinis | |
| 2005/0288011 A1 | 12/2005 | Dutta | |
| 2006/0040613 A1 | 2/2006 | Karabinis et al. | |
| 2006/0040659 A1 | 2/2006 | Karabinis | |
| 2006/0094352 A1 | 5/2006 | Karabinis | |
| 2006/0094420 A1 | 5/2006 | Karabinis | |
| 2006/0105707 A1 | 5/2006 | Karabinis | |
| 2006/0111041 A1 | 5/2006 | Karabinis | |
| 2006/0111056 A1 | 5/2006 | Dutta | |
| 2006/0135058 A1 | 6/2006 | Karabinis | |
| 2006/0135070 A1 | 6/2006 | Karabinis | |
| 2006/0165120 A1 | 7/2006 | Karabinis | |
| 2006/0189274 A1 | 8/2006 | Karabinis | |
| 2006/0189275 A1 | 8/2006 | Karabinis | |
| 2006/0189309 A1 | 8/2006 | Good et al. | |
| 2006/0194576 A1 | 8/2006 | Karabinis et al. | |
| 2006/0205346 A1 | 9/2006 | Evans et al. | |
| 2006/0205347 A1 | 9/2006 | Karabinis | |
| 2006/0205367 A1 | 9/2006 | Karabinis | |
| 2006/0211371 A1 | 9/2006 | Karabinis et al. | |
| 2006/0211419 A1 | 9/2006 | Karabinis | |
| 2006/0211452 A1 | 9/2006 | Karabinis | |
| 2006/0217070 A1 | 9/2006 | Karabinis | |
| 2006/0246838 A1 | 11/2006 | Karabinis | |
| 2006/0252368 A1 | 11/2006 | Karabinis | |
| 2006/0276129 A1 | 12/2006 | Karabinis | |
| 2006/0292990 A1 | 12/2006 | Karabinis et al. | |
| 2007/0010246 A1 | 1/2007 | Churan | |
| 2007/0015460 A1 | 1/2007 | Karabinis et al. | |
| 2007/0021059 A1 | 1/2007 | Karabinis et al. | |
| 2007/0021060 A1 | 1/2007 | Karabinis et al. | |
| 2007/0026867 A1 | 2/2007 | Karabinis | |
| 2007/0037514 A1 | 2/2007 | Karabinis | |
| 2007/0072545 A1 | 3/2007 | Karabinis et al. | |
| 2007/0087690 A1 | 4/2007 | Karabinis | |
| 2007/0099562 A1 | 5/2007 | Karabinis et al. | |
| 2007/0123252 A1 | 5/2007 | Tronc et al. | |
| 2007/0129019 A1 | 6/2007 | Otten et al. | |
| 2007/0135051 A1 | 6/2007 | Zheng et al. | |
| 2007/0149127 A1 | 6/2007 | Karabinis | |
| 2007/0184849 A1 | 8/2007 | Zheng | |
| 2007/0192805 A1 | 8/2007 | Dutta et al. | |
| 2007/0202816 A1 | 8/2007 | Zheng | |
| 2007/0232298 A1 | 10/2007 | Karabinis | |
| 2007/0243866 A1 | 10/2007 | Karabinis | |
| 2007/0281612 A1 | 12/2007 | Benjamin et al. | |
| 2007/0293214 A1 | 12/2007 | Ansari et al. | |
| 2008/0008264 A1 | 1/2008 | Zheng | |
| 2008/0032671 A1 | 2/2008 | Karabinis | |
| 2008/0032690 A1 | 2/2008 | Karabinis | |
| 2008/0113666 A1 | 5/2008 | Monte et al. | |
| 2008/0119190 A1 | 5/2008 | Karabinis | |
| 2008/0160993 A1 | 7/2008 | Levin et al. | |
| 2008/0182572 A1 | 7/2008 | Tseytlin et al. | |
| 2008/0214207 A1 | 9/2008 | Karabinis | |
| 2008/0268836 A1 | 10/2008 | Karabinis et al. | |
| 2009/0011704 A1 | 1/2009 | Karabinis | |
| 2009/0029696 A1 | 1/2009 | Karabinis | |
| 2009/0040100 A1 | 2/2009 | Levin et al. | |
| 2009/0042509 A1 | 2/2009 | Karabinis et al. | |
| 2009/0042516 A1 | 2/2009 | Karabinis | |
| 2009/0075645 A1 | 3/2009 | Karabinis | |
| 2009/0088151 A1 | 4/2009 | Karabinis | |
| 2009/0137203 A1 | 5/2009 | Karabinis et al. | |
| 2009/0170427 A1 | 7/2009 | Karabinis | |
| 2009/0170428 A1 | 7/2009 | Karabinis | |
| 2009/0170429 A1 | 7/2009 | Karabinis | |
| 2009/0186622 A1 | 7/2009 | Karabinis | |

FOREIGN PATENT DOCUMENTS

| | | |
|---|---|---|
| EP | 0 506 255 A3 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 231 723 A1 | 8/2002 |
| EP | 1 944 885 A2 | 7/2008 |
| EP | 1 569 363 B1 | 11/2008 |
| WO | WO 01/54314 A1 | 7/2001 |

OTHER PUBLICATIONS

Ayyagari et al., "A satellite-augmented cellular network concept", *Wireless Networks*, Vo. 4, 1998, pp. 189-198.

International Search Report and Written Opinion (10 pages) corresponding to International Application No. PCT/US2006/000791; Mailing Date: Jun. 6, 2006.

Severijns et al., "The intermediate module concept within the SATIN proposal for the S-UMTS air interface," IST Mobile and Wireless Telecommunications Summit, Thessaloniki, Greece, Jun. 16-19, 2002, 5 pages.

Schiff et al., "Design and system operation of Globalstar™ versus IS-95 CDMA—similarities and differences," Wireless Networks, vol. 6, 2000, pp. 47-57.

SATELLITE/TERRESTRIAL WIRELESS COMMUNICATIONS SYSTEMS AND METHODS USING DISPARATE CHANNEL SEPARATION CODES

CROSS REFERENCE TO RELATED APPLICATION

This application is a continuation of U.S. patent application Ser. No. 11/044,477, filed Jan. 27, 2005 now U.S. Pat. No. 7,596,111, entitled Satellite/Terrestrial Wireless Communications Systems and Methods Using Disparate Channel Separation Codes, assigned to the assignee of the present application, the disclosure of which is hereby incorporated herein by reference in its entirety as if set forth fully herein.

FIELD OF THE INVENTION

This invention relates to wireless communications systems and methods and, more particularly, to wireless communications systems and methods having space-based and terrestrial components.

BACKGROUND OF THE INVENTION

Satellite communications systems and methods are widely used for wireless communications. Satellite communications systems and methods generally employ at least one space-based component, such as one or more satellites, that is/are configured to wirelessly communicate with radioterminals.

A satellite radioterminal communications system or method may utilize a single antenna beam pattern covering an entire area served by the system. Alternatively, in cellular satellite radioterminal communications systems and methods, multiple antenna beam patterns (cells) are provided, each of which can serve substantially distinct geographical areas in the overall service region, to collectively serve an overall satellite footprint. Thus, a cellular architecture similar to that used in conventional terrestrial cellular/PCS radioterminal systems and methods can be implemented in cellular satellite-based systems and methods. The satellite typically communicates with radioterminals over a bidirectional communications pathway, with radioterminal communication signals being communicated from the satellite to the radioterminal over a downlink or forward link, and from the radioterminal to the satellite over an uplink or return link.

The overall design and operation of cellular satellite radioterminal systems and methods are well known to those having skill in the art, and need not be described further herein. Moreover, as used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and a pager, Internet/Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A "radioterminal" also may be referred to herein as a "radiotelephone," "terminal" or "wireless user device".

Terrestrial networks can enhance cellular satellite radioterminal system availability, efficiency and/or economic viability by terrestrially reusing at least some of the frequency bands that are allocated to cellular satellite radioterminal systems. In particular, it is known that it may be difficult for cellular satellite radioterminal systems to reliably serve densely populated areas, because the satellite signal may be blocked by high-rise structures and/or may not penetrate into buildings. As a result, the satellite spectrum may be underutilized or unutilized in such areas. The terrestrial use and/or reuse of at least some of the satellite system frequencies can reduce or eliminate this potential problem. Globalstar™ has proposed a satellite mobile communications system with an ancillary terrestrial component (ATC). Demonstrations in 2002 employed Telit Model 650 Globalstar™ phones modified to use the system's satellite spectrum for terrestrial cellular calls.

The capacity of a hybrid system, including terrestrial and satellite-based connectivity and configured to terrestrially use and/or reuse at least some of the satellite-band frequencies, may be higher than a corresponding satellite-only system since terrestrial frequency use and/or reuse may be much denser than that of the satellite-only system. In fact, capacity may be enhanced where it may be mostly needed, i.e., in densely populated urban/industrial/commercial areas where the connectivity/signal(s) of a satellite-only system may be unreliable. As a result, a hybrid (satellite/terrestrial cellular) system that is configured to use and/or reuse terrestrially at least some of the frequencies of the satellite band may become more economically viable, as it may be able to serve more effectively and reliably a larger subscriber base.

One example of terrestrial reuse of satellite band frequencies is described in U.S. Pat. No. 5,937,332 to the present inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink signal received from a satellite thereby increasing the effective downlink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radioterminals for a satellite radioterminal system or method having a terrestrial communications capability by terrestrially using and/or reusing at least some of the satellite frequency band and using substantially the same air interface for both terrestrial and satellite communications may be more cost effective and/or aesthetically appealing than other alternatives. Conventional dual band/dual mode radioterminal alternatives, such as the well known Thuraya, Iridium and/or Globalstar dual mode satellite/terrestrial radioterminals, duplicate some components (as a result of the different frequency bands and/or air interface protocols that are used between satellite and terrestrial communications), which can lead to increased cost, size and/or weight of the radioterminal. See U.S. Pat. No. 6,052,560 to the present inventor Karabinis, entitled Satellite System Utilizing a Plurality of Air Interface Standards and Method Employing Same.

U.S. Pat. No. 6,684,057, to present inventor Karabinis, and entitled Systems and Methods for Terrestrial Reuse of Cellular Satellite Frequency Spectrum, the disclosure of which is hereby incorporated herein by reference in its entirety as if set forth fully herein, describes that a satellite frequency can be reused terrestrially by an ancillary terrestrial network even within the same satellite cell, using interference cancellation techniques. In particular, a system according to some embodiments of U.S. Pat. No. 6,684,057 includes a space-based component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

Satellite radioterminal communications systems and methods that may employ terrestrial reuse of satellite frequencies are also described in Published U.S. Patent Application Nos. US 2003/0054760 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; U.S. Pat. No. 6,785,543 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

In particular, published U.S. Patent Application No. US 2003/0054762, cited above, describes in the Abstract thereof that satellite radiotelephone systems and communications methods include a space-based component that is configured to communicate with radiotelephones in a satellite footprint that is divided into satellite cells. The space-based component is configured to communicate with a first radiotelephone in a first satellite cell over a first frequency band and/or a first air interface, and to communicate with a second radiotelephone in the first or a second satellite cell over a second frequency band and/or a second air interface. An ancillary terrestrial network also is provided that is configured to communicate terrestrially with the first radiotelephone over substantially the first frequency band and/or substantially the first air interface, and to communicate terrestrially with the second radiotelephone over substantially the second frequency band and/or substantially the second air interface.

U.S. Pat. No. 5,073,900 to Mallinckrodt entitled Integrated Cellular Communications System provides a cellular communications system having both surface and satellite nodes which are fully integrated for providing service over large areas. A spread spectrum system is used with code division multiple access (CDMA) employing forward error correction coding (FECC) to enhance the effective gain and selectivity of the system. Multiple beam, relatively high gain antennas are disposed in the satellite nodes to establish the satellite cells, and by coupling the extra gain obtained with FECC to the high gain satellite node antennas, enough gain is created in the satellite part of the system such that a user need only use a small, mobile handset with a non-directional antenna for communications with both ground nodes and satellite nodes.

It is known to structure air interfaces of mobile satellite communications systems such that they are similar to air interfaces used in terrestrial mobile communications systems. For example, an article by Schiff and Chockalingam entitled "Design and system operation of Globalstar™ versus IS-95 CDMA-similarities and differences," Wireless Networks 6, pp. 47-57 (J. C. Balzer A G, Science Publishers, 2000), describes the Globalstar air interface as an extension of the IS-95 standard that is used in terrestrial digital cellular systems, with certain departures from IS-95 to accommodate differences between satellite links and cellular terrestrial links. Among the departures is the use of 128-chip Walsh codes for differentiating users in each satellite beam in contrast to the 64-bit Walsh codes used in IS-95 for intra-cell channelization.

SUMMARY OF THE INVENTION

In some embodiments of the present invention, a wireless communications system includes a space-based component (SBC) and an ancillary terrestrial component (ATC) configured to communicate with radioterminals using a common satellite service link frequency band and respective first and second different sets of channel separation codes. The first and second sets of channel separation codes may include, for example, respective sets of scrambling codes, respective sets of frequency assignment codes, respective sets of channel assignment codes, respective sets of sub-channel assignment codes and/or respective sets of spreading codes.

In some embodiments, for example, the first and second sets of channel separation codes may include respective sets of spreading codes that are different, respective sets of frequency assignment codes that are different, respective sets of channel assignment codes that are different and/or respective sets of sub-channel assignment codes that are different. The first and second sets of channel separation codes may include, for example, respective sets of Walsh codes of different lengths, respective sets of different OFDM/OFDMA frequency assignment codes, respective sets of different OFDM/OFDMA channel assignment codes and/or respective sets of different OFDM/OFDMA sub-channel assignment codes.

In further embodiments of the present invention, the first and second sets of channel separation codes include respective first and second sets of code phases of the same code. The first and/or second sets of code phases may be functions of first and/or second radioterminal identifiers.

In additional embodiments of the present invention, the SBC and the ATC employ the same chip rate, the SBC employs a symbol period that is an integer multiple of a symbol period used by the ATC, and the first set of channel separation codes includes a first set of spreading codes having a first length. The second set of channel separation codes includes a second set of spreading codes having a second length, wherein the first length is an integer multiple of the second length.

According to further embodiments of the present invention, the first and/or second sets of channel separation codes are functions of at least one radioterminal identifier. The SBC and/or the ATC may be operative to generate the respective first and second sets of channel separation codes responsive to at least one radioterminal identifier.

In additional embodiments of the present invention, the SBC is configured to communicate with radioterminals using a Frequency Division Duplex (FDD) air interface protocol and wherein the ATC is configured to communicate with radioterminals using a Time Division Duplex (TDD) air interface protocol. The TDD and/or the FDD air interface protocol may be, for example, an Orthogonal Frequency Division Multiplexed (OFDM) and/or Orthogonal Frequency Division Multiple Access (OFDMA) air interface protocol.

According to some embodiments, the SBC communicates with radioterminals using a first sub-band of the satellite service link frequency band, and the ATC communicates with radioterminals using a second sub-band of the satellite service link frequency band. The first and second sub-bands may not overlap, or may at least partially overlap.

In some embodiments of the present invention, methods of operating a wireless communications system including a space-based component (SBC) and an ancillary terrestrial component (ATC) configured to communicate with radioterminals using a common satellite service link frequency band are provided. Communications between at least some of the radioterminals and the SBC use a first set of channel separation codes. Communications between at least some of the radioterminals and the ATC use a second set of channel separation codes that is different from the first set of channel separation codes.

According to additional embodiments of the present invention, a radioterminal includes a radio transceiver configured to communicate with a space-based component (SBC) and an ancillary terrestrial component (ATC) of a mobile satellite communications system using a common satellite service link frequency band using channel separation codes from respective first and second sets of channel separation codes.

In other embodiments, an SBC of a wireless communications system is configured to communicate with radioterminals using a common service link frequency band with an ATC. The SBC uses a first set of channel separation codes that is different than a second set of channel separation codes used by the ATC.

In still further embodiments, an ATC of a wireless communications system is configured to communicate with radioterminals using a common service link frequency band with an SBC. The SBC uses a first set of channel separation codes that is different than a second set of channel separation codes used by the ATC.

DETAILED DESCRIPTION

Figure 1:
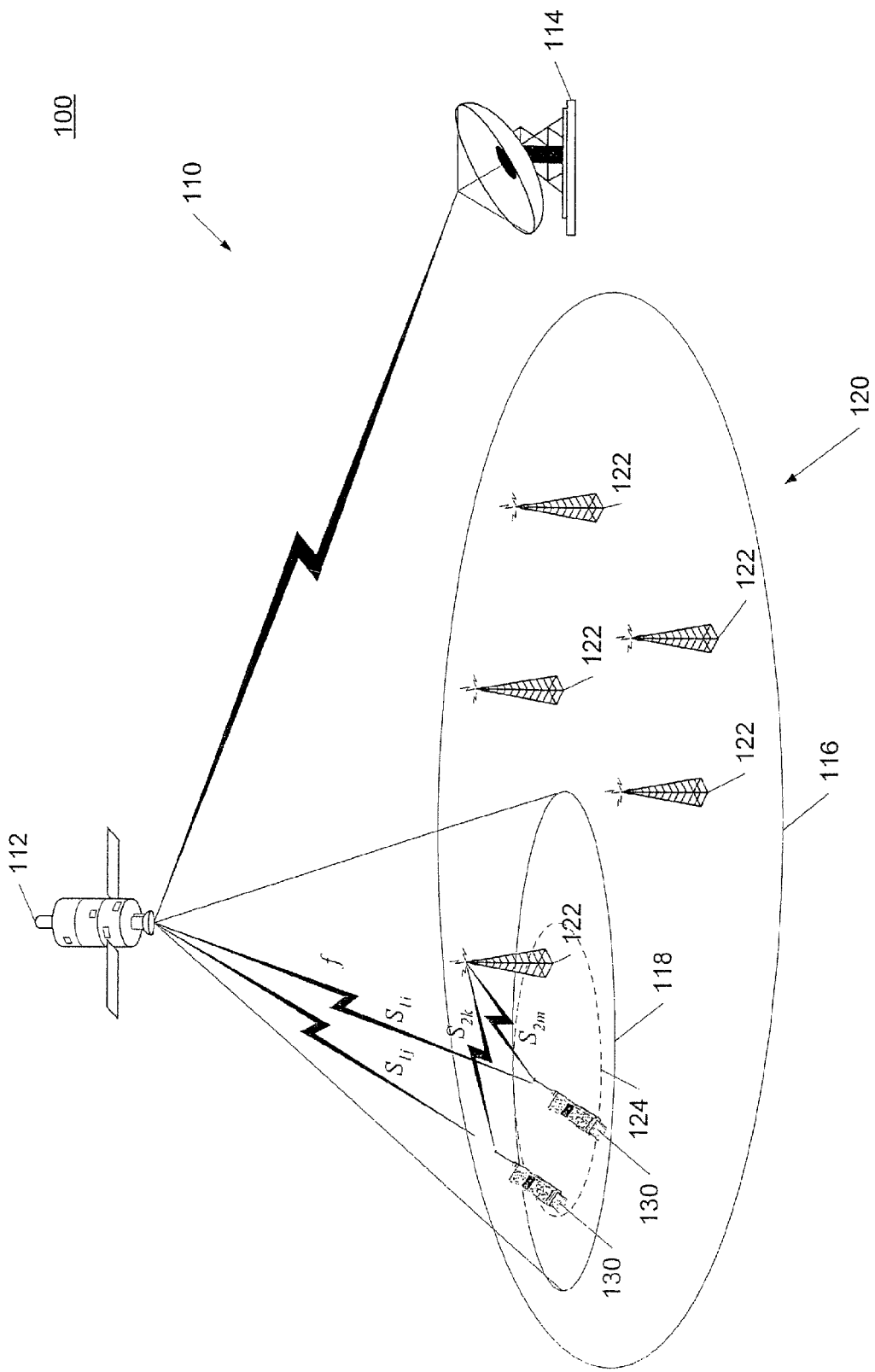
FIG. 1 illustrates a hybrid wireless communication system with space-based and terrestrial components and operations thereof according to some embodiments of the present invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

Embodiments of the present invention described herein refer to use of different channel separation code sets, e.g., different sets of spreading codes, frequency, channel and/or sub-channel assignment codes and/or scrambling codes, for respective terrestrial and satellite-based components of a wireless communications system, wherein at least one of the sets includes a code that is not included in the other set. As used herein, "channel separation" codes include codes that spread a data stream across a radio spectrum by effectively increasing the transmitted data/chip rate, as well as scrambling codes and/or frequency, channel and/or sub-channel assignment codes that provide channel (data source) discrimination without increasing the data rate. As will be understood, some of the codes may be relatively long pseudo-noise (PN) codes having low cross-correlation and/or autocorrelation properties, and that signal discrimination may be provided by using different phases of such codes to provide different channels. Accordingly, as used herein, "different codes" can refer to different ones of such codes (e.g., different "base" PN codes), as well as different code phases of the same code.

FIG. 1 illustrates a wireless communications system 100 and exemplary operations thereof according to some embodiments of the present invention. The system 100 includes a space based component (SBC) 110 including at least one satellite 112 that is configured to communicate with radioterminals 130 in a satellite coverage area 116 and with a ground-based satellite gateway 114. The satellite coverage area 116 includes a plurality of satellite cells 118 that are served by respective spot beams (cells) of the satellite 112. The system 100 further includes an ancillary terrestrial component (ATC) 120 including a plurality of ancillary terrestrial base stations 122 that serve terrestrial cells 124, which may be adjacent to and/or overlap satellite cells of the satellite coverage area 116.

According to various embodiments of the present invention, the SBC 110 and the ATC 120 communicate with the radioterminals 130 using a common band of frequencies f. As described herein, the common band of frequencies f may be coextensive with an entire band of frequencies used by the SBC 110 (such as S- or L-band), or continuous and/or disjoint sub-bands of such a band. Channel separation codes $S_{1i}, \ldots S_{1j}$ from a first set of channel separation codes are used for communications between the SBC 110 and the radioterminals 130 and channel separation codes $S_{2k}, \ldots S_{2m}$, from a second set of channel separation codes are used for communications between the ATC 120 and the radioterminals 130. The different channel separation code sets may be, for example, different orthogonal (e.g., Walsh) code sets, different frequency, channel and/or sub-channel assignment codes sets, different quasi-orthogonal or non-orthogonal code sets (e.g., repeating codes, such as "long codes" and/or "short codes") that exhibit relatively low cross-correlation and/or different sets of code phases of a code.

Figure 2:
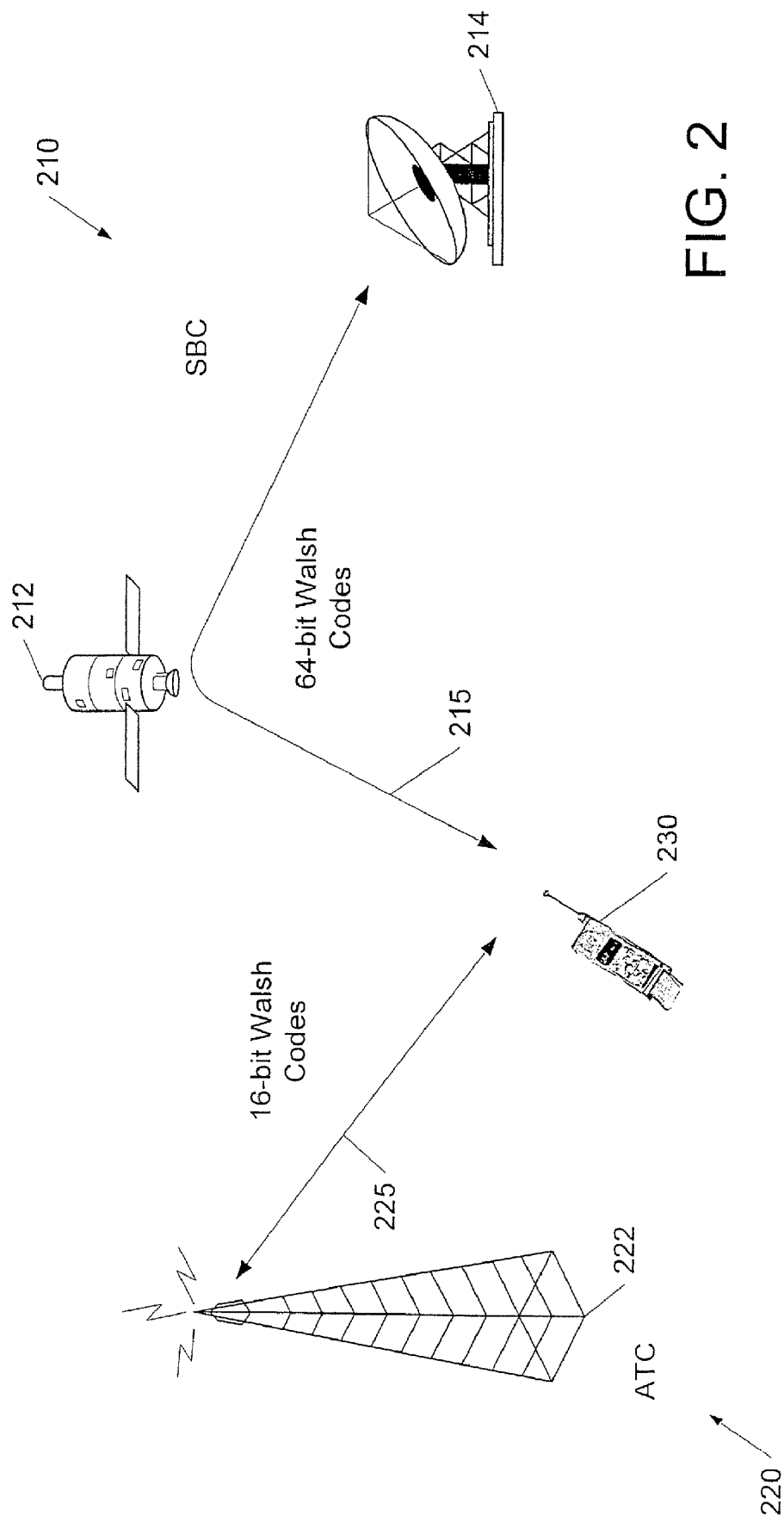
FIG. 2 illustrates use of different channel separation codes for communication with space-based and terrestrial components of a wireless communications system according to further embodiments of the present invention.

In some embodiments of the present invention, different code sets may be used on satellite and terrestrial links in a hybrid wireless communications system. For example, as shown in FIG. 2, forward/return channels 215, 225 from/to a satellite 212 of an SBC 210 and a terrestrial base station 222 of an ATC 220, respectively, to/from a radioterminal 230 may be spread according to different sets of Walsh codes. In particular, the ATC 220 may use, for example, a set of 16-bit Walsh codes to define its forward/return channels 225, while the SBC 210 may use, for example, a set of 64-bit Walsh codes to define its forward/return channels 215. The use of different channel separation codes on the satellite and terrestrial forward/return channels can improve the ability of the radioterminal 230 and/or other system elements to discriminate between transmissions of the satellite 212 and the terrestrial base station 222. The use of longer Walsh codes on the satellite channels 215 can also enable provision of more forward/return channels per carrier frequency in the SBC 210 in relation to the number of forward/return channels per carrier frequency of the ATC 220. The longer codes may be used on the satellite channels 215 at the same chip rate as in the terrestrial (ATC) channels 225 by increasing the information/channel symbol length on the satellite channels 215 in relation to the information/channel symbol length used on the terrestrial channels 225. For example, for the illustrated embodiments, the information/channel symbol length of the satellite channels 215 may be four times the information/channel symbol length of the terrestrial channels 225 to allow use of the same chip rate on both sets of channels.

Figure 3:
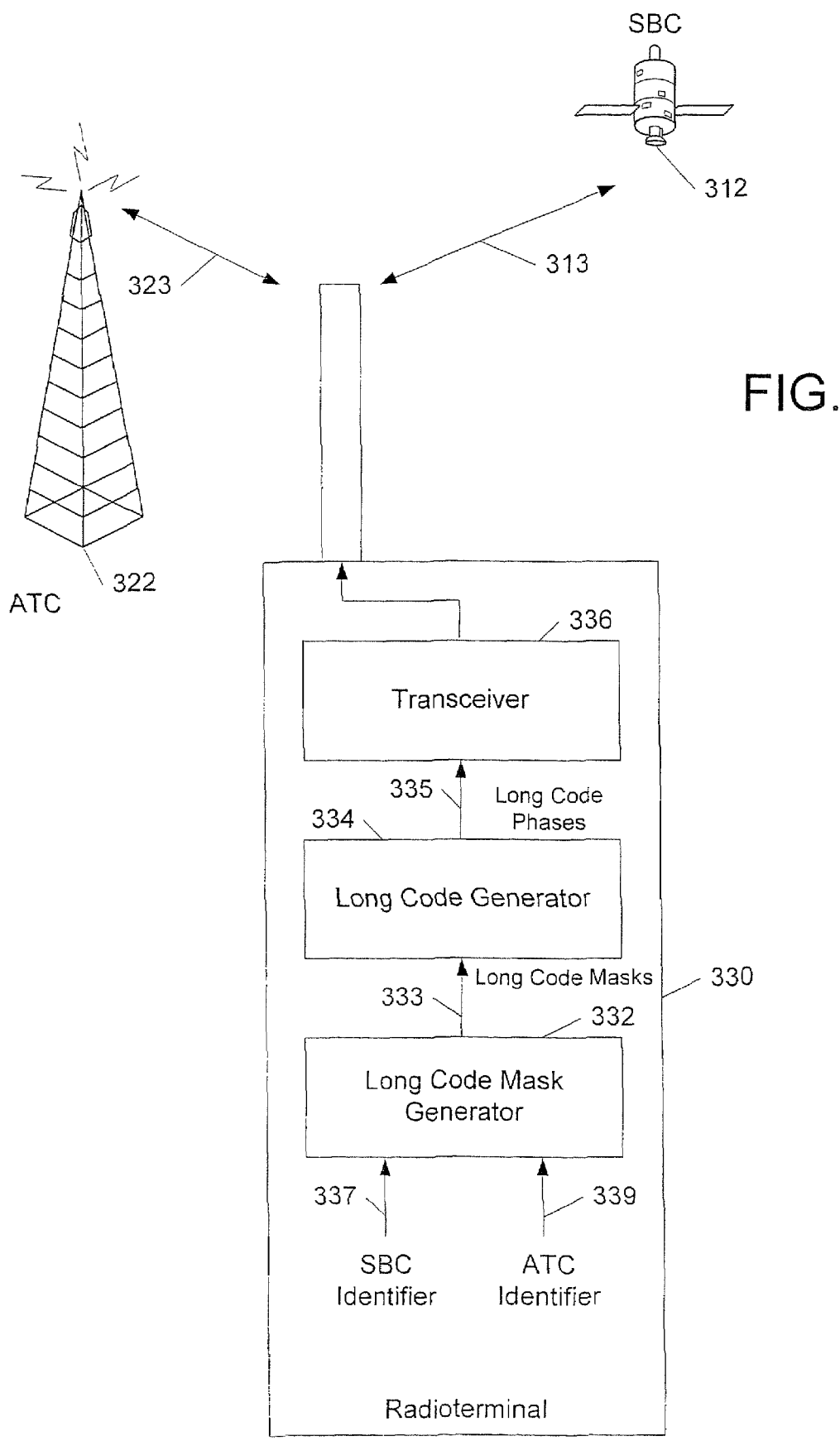
FIG. 3 illustrates a radioterminal configured to generate different channel separation codes for return links to space-based and terrestrial components of a wireless communications system according to additional embodiments of the present invention.

In other embodiments of the present invention, different sets of other types of spreading and/or scrambling codes may be used to provide discrimination between terrestrial and satellite-based communications in hybrid communications systems. In some embodiments, for example, different sets of code phases of a code may be used for return/forward channel communications with respective terrestrial and satellite-based components. For example, as shown in FIG. 3, a radioterminal 330 configured to communicate with an ATC base station 322 and an SBC satellite 312 includes a radio transceiver 336 that is configured to support communications to the base station 322 and the satellite 312 using a code phase 335 generated by a long code generator 334. The long code generator 334 generates the long code phase 335 responsive to long code masks 333 generated by a long code mask generator 332 dependent upon whether the code phase generation is for communication with a terrestrial base station or a satellite. For communication over the link 323 to the terrestrial base station 322, the long code mask generator 332 generates a first long code mask 333 responsive to an ATC identifier 339 for the radioterminal 330. For communication over the link 313 to the satellite 312, the long code mask generator generates a different long code mask 333 responsive to an SBC identifier 337 for the radioterminal 330. In some embodiments, for example, the SBC identifier 337 alone may be used to generate a long code mask, while in other embodiments, a long code mask for communication with the satellite 312 may be generated from a combination of the SBC identifier 337 and the ATC identifier 339.

The identifiers 337, 339 and the code generators of such radioterminals may be designed to constrain code phase generation and/or selection such that different sets of code phases are assigned to terrestrial and satellite-based communications, which can reduce cross-correlation therebetween. It will be appreciated that, in further embodiments, other radioterminal identifiers, in conjunction with, or independently of, the ATC and SBC identifiers 339, 337 shown in FIG. 3, may also be used to define and/or generate, for example, short codes, long codes, frequency assignment codes and/or orthogonal codes, such that code selections are constrained, for example, to minimize or otherwise optimize cross-correlation between terrestrial and satellite-based communications that share a common frequency service link band.

It will be understood that the exemplary embodiments shown in FIGS. 2 and 3 are provided for purposes of illustration, and that other embodiments fall within the scope of the present invention. For example, in some embodiments of the present invention, different channel separation code sets may be used on both forward and return links in a hybrid satellite/terrestrial wireless communications system, and these code sets may include orthogonal code sets and/or non-orthogonal code sets.

Figure 4:
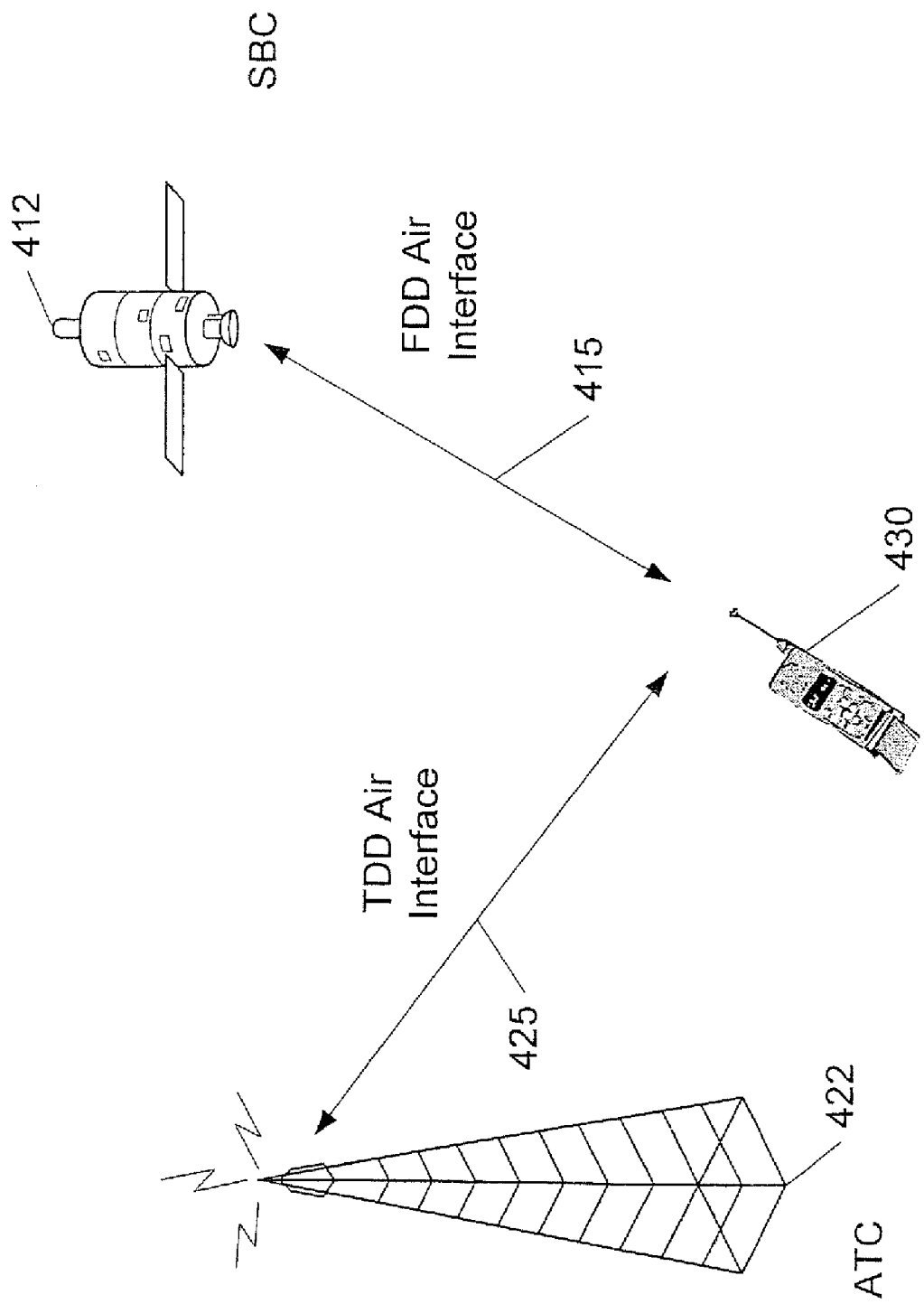
FIG. 4 illustrates use of different types of air interfaces for communication with space-based and terrestrial components of a wireless communications system according to some embodiments of the present invention.
Figure 5:
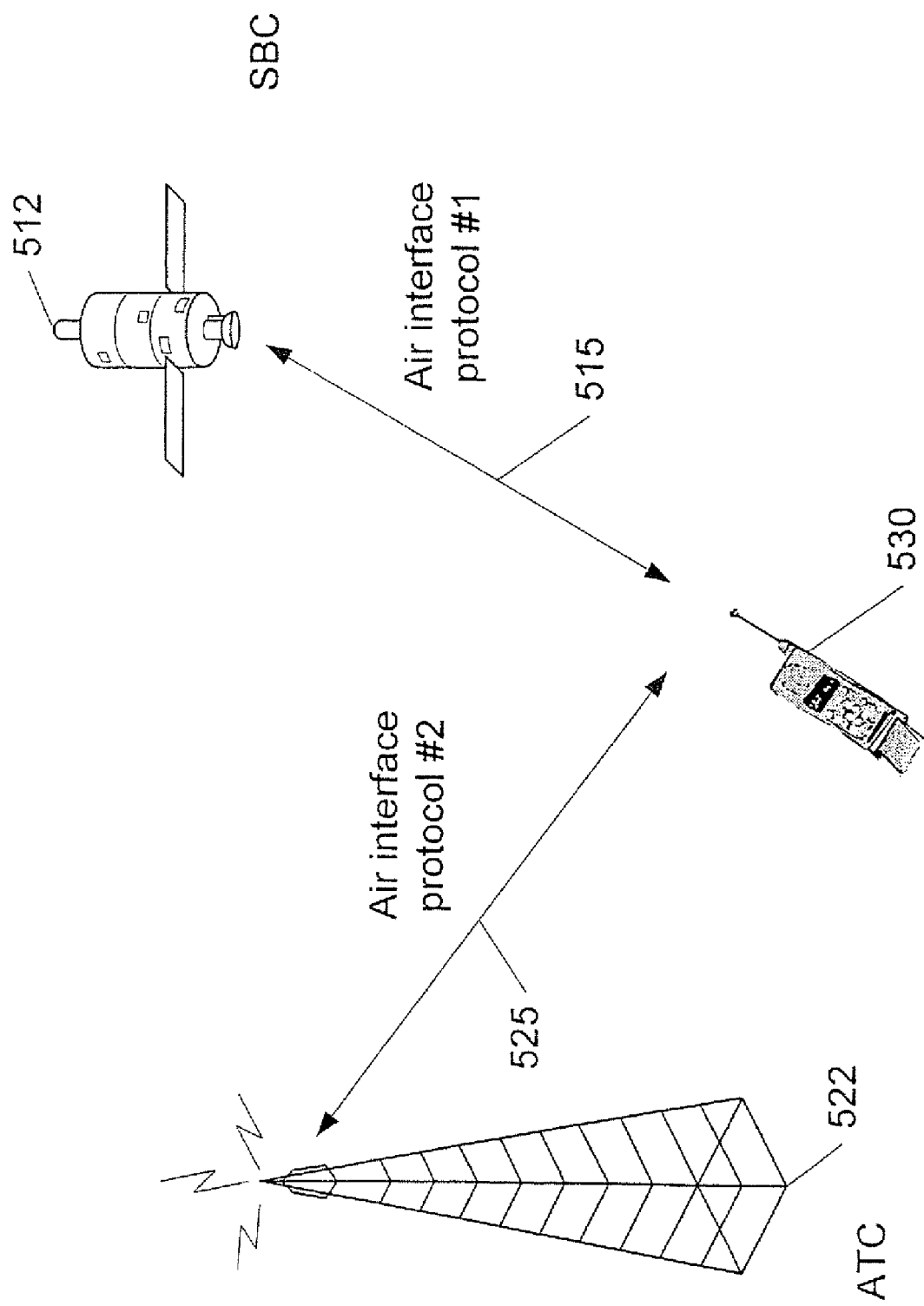
FIG. 5 illustrates use of different air interface protocols for communication with space-based and terrestrial components of a wireless communications system according to further embodiments of the present invention.

In further embodiments of the present invention, an ATC and an SBC may also use different time and/or frequency allocation schemes, for example, different types of air interfaces that use different types of time and/or frequency based signal discrimination techniques. For example, referring to FIG. 4, a radioterminal 430 may be configured to communicate with a base station 422 of an ATC using a Time Division Duplex (TDD) air interface 425 and to communicate with a satellite 412 of an SBC using a Frequency Division Duplex (FDD) air interface 415. In some embodiments illustrated in FIG. 5, a radioterminal 530 may be configured to communicate with an ATC base station 522 and an SBC satellite 512 using different air interface protocols 515, 525, such as different air interface protocols selected from such air interface protocols (and combinations thereof) as a Code Division Multiplexing (CDM) air interface protocol, a Code Division Multiple Access (CDMA) air interface protocol, a Time Division Multiplexing (TDM) air interface protocol, a Time Division Multiple Access (TDMA) air interface protocol, a Frequency Division Multiplexing (FDM) air interface protocol, and/or a Frequency Division Multiple Access (FDMA) air interface protocol, such as an Orthogonal Frequency Division Multiplexing and/or an Orthogonal Frequency Division Multiple Access (OFDM/OFDMA) air interface protocol.

In further embodiments of the present invention, a radioterminal may be configured to use different channel separation/discrimination code sets, such as different frequency, channel and/or sub-channel assignment code sets, when communicating with an ATC base station than when the radioterminal is communicating with an SBC satellite. In some embodiments, the different channel separation/discrimination code sets, such as different frequency, channel and/or sub-channel assignment code sets of the ATC and the SBC, may depend on geographical location.

In additional embodiments of the present invention, in order to further increase discrimination between ATC and SBC communications over a given geographic area and/or respective different geographic areas, different sub-bands of a common satellite frequency band may be allocated to the ATC and the SBC for communications. In some embodiments the different sub-bands at least partially overlap and, in other embodiments, the sub-bands do not overlap. In still other embodiments, subject to a level of discrimination between the communications of the ATC and the SBC, as may be provided, for example, by the different sub-bands, different controllers may be used by the ATC and the SBC, wherein the controllers may be configured to operate at least partially autonomously. In some embodiments, there may be no need for a communications path between the different controllers (autonomous and independent operation). In other embodiments, a communications path between the different controllers may be provided and the controllers may be operatively configured with at least some inter-dependency. The communications path may be established via manual means (i.e., a person informing an other person) and/or via automatic (i.e., electronic) means.

In other embodiments of the invention, an ATC and an SBC communicate with radioterminals using different channel separation codes and different air interface protocols in order to further increase channel separation/discrimination between the SBC and the ATC communications and/or for other reasons such as spectral/communications efficiency. In some embodiments, for example, an ATC communicates with radioterminals using a CDM/CDMA air interface protocol and an SBC communicates with radioterminals using a TDM/TDMA air interface protocol. Various combinations of the embodiments described above may also be used. For example, different sub-bands, different air interface protocols, and different channel separation codes may be used in various combinations by an SBC and an ATC.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A wireless communications system comprising an ancillary terrestrial component (ATC) that is associated with a space based component (SBC) and is configured to communicate with first radioterminals using first frequencies of a satellite frequency band while the SBC communicates with second radioterminals using second frequencies of the satellite frequency band, wherein the ATC is further configured to communicate with the first radioterminals using an OFDM/OFDMA air interface protocol and a first set of channel separation codes that differs from a second set of channel separation codes that is used by the SBC to communicate with the second radioterminals.

2. A system according to claim 1, wherein the SBC and the ATC communicate with radioterminals using respective first and second different air interface protocols.

3. A system according to claim 1, wherein the first and second sets of channel separation codes comprise respective sets of scrambling codes, respective sets of frequency assignment codes, respective sets of channel assignment codes, respective sets of sub-channel assignment codes and/or respective sets of spreading codes.

4. A system according to claim 1, wherein the first and second sets of channel separation codes comprise respective different sets of spreading codes, respective different sets of frequency assignment codes, respective different sets of channel assignment codes and/or respective different sets of sub-channel assignment codes.

5. A system according to claim 1, wherein the first and second sets of channel separation codes comprise respective different sets of Walsh codes, respective different sets of OFDM/OFDMA frequency assignment codes, respective different sets of OFDM/OFDMA channel assignment codes and/or respective different sets of OFDM/OFDMA sub-channel assignment codes.

6. A system according to claim 1, wherein the first and second sets of channel separation codes comprise respective different first and second sets of code phases of the same code.

7. A system according to claim 6, wherein the first and/or second sets of code phases are functions of first and/or second radioterminal identifiers.

8. A system according to claim 1, wherein the first and second sets of channel separation codes comprise respective first and second sets of long codes and/or short codes.

9. A system according to claim 1, wherein the SBC and the ATC employ the same chip rate, wherein the SBC employs a symbol period that is an integer multiple of a symbol period used by the ATC, wherein the first set of channel separation codes comprises a first set of spreading codes having a first length, wherein the second set of channel separation codes comprises a second set of spreading codes having a second length, and wherein the second length is an integer multiple of the first length.

10. A system according to claim 1, wherein the first and/or second sets of channel separation codes are functions of at least one radioterminal identifier.

11. A system according to claim 1, wherein the SBC and/or the ATC are operative to generate the respective first and second sets of channel separation codes responsive to at least one radioterminal identifier.

12. A system according to claim 1 wherein the SBC is configured to communicate with radioterminals using a FDD air interface protocol and wherein the ATC is configured to communicate with the radioterminals using a TDD air interface protocol.

13. A system according to claim 12 wherein the TDD and/or the FDD air interface protocol is an OFDM and/or OFDMA air interface protocol.

14. A system according to claim 1, wherein the SBC communicates with radioterminals using a first sub-band of the satellite frequency band, and wherein the ATC communicates with the radioterminals using a second sub-band of the satellite frequency band.

15. A system according to claim 14, wherein the first and second sub-bands do not overlap.

16. A system according to claim 14, wherein the first and second sub-bands at least partially overlap.

17. A method of operating a wireless communications system comprising an ancillary terrestrial component (ATC) that is associated with a space based component (SBC), the method comprising:
communicating between the ATC and first radioterminals using an OFDM/OFDMA air interface protocol and first frequencies of a satellite frequency band while the SBC communicates with second radioterminals using second frequencies of the satellite frequency band; and
communicating between the ATC and the first radioterminals using a first set of channel separation codes that differs from a second set of channel separation codes that is used by the SBC to communicate with the second radioterminals.

18. A method according to claim 17:
wherein communicating between the ATC and the first radioterminals using a first set of channel separation codes that differs from a second set of channel separation codes that is used by the SBC to communicate with the second radioterminals comprises communicating between the first radioterminals and the ATC using an air interface protocol that is different from an air interface protocol that is used by the second radioterminals to communicate with the SBC.

19. A method according to claim 17, wherein the first and second sets of channel separation codes comprise respective sets of scrambling codes, respective sets of frequency assignment codes, respective sets of channel assignment codes, respective sets of sub-channel assignment codes and/or respective sets of spreading codes.

20. A method according to claim 17, wherein the first and second sets of channel separation codes comprise respective different sets of spreading codes, respective different sets of frequency assignment codes, respective different sets of channel assignment codes, and/or respective different sets of sub-channel assignment codes.

21. A method according to claim 17, wherein the first and second sets of channel separation codes comprise respective different sets of Walsh codes, respective different sets of OFDM/OFDMA frequency assignment codes, respective different sets of channel assignment codes, and/or respective different sets of sub-channel assignment codes.

22. A method according to claim 17, wherein the first and second sets of channel separation codes comprise respective different first and second sets of code phases of the same code.

23. A method according to claim 22, wherein the first and/or second sets of code phases are functions of first and/or second radioterminal identifiers.

24. A method according to claim 17, wherein the first and second sets of channel separation codes comprise respective first and second sets of long codes and/or short codes.

25. A method according to claim 17, further comprising using the same chip rate for communications between the SBC and the second radioterminals and for communications between the ATC and the first radioterminals, wherein communications between the second radioterminals and the SBC employ a symbol period that is an integer multiple of a symbol period used for communications between the first radioterminals and the ATC, wherein the first set of channel separation codes comprises a first set of spreading codes having a first length, wherein the second set of channel separation codes comprises a second set of spreading codes having a second length, and wherein the second length is an integer multiple of the first length.

26. A method according to claim 25, wherein the first and second sub-bands at least partially overlap.

27. A method according to claim 17, further comprising generating and/or selecting codes from the first and/or second sets of channel separation codes responsive to at least one radioterminal identifier.

28. A method according to claim 17:
wherein communicating between the ATC and first radioterminals using first frequencies of a satellite frequency band while the SBC communicates with second radioterminals using second frequencies of the satellite frequency band comprises the ATC using a first sub-band of the satellite frequency band while the SBC is using a second sub-band of the satellite frequency band.

29. A method according to claim 28, wherein the first and second sub-bands do not overlap.

30. A radioterminal comprising:
a radio transceiver configured to communicate with a space-based component (SBC) of a mobile satellite communications system using first frequencies of a satellite frequency band and to communicate with an ancillary terrestrial component (ATC) of the mobile satellite communications system using second frequencies of the satellite frequency band, wherein the radio transceiver is further configured to use an OFDM/OFDMA air interface protocol to communicate with the ATC and respective different first and second channel separation codes to communicate with the SBC and the ATC.

31. A radioterminal according to claim 30, wherein the radio transceiver is further configured to communicate with the SBC using a first air interface protocol and to communicate with the ATC using a second air interface protocol that is different than the first air interface protocol.

32. A radioterminal according to claim 30, wherein the first and second channel separation codes comprise respective scrambling codes, respective frequency assignment codes, respective channel assignment codes, respective sub-channel assignment codes and/or respective spreading codes.

33. A radioterminal according to claim 30, wherein the first and second channel separation codes comprise respective different spreading codes, respective different frequency assignment codes, respective different channel assignment codes and/or respective different sub-channel assignment codes.

34. A radioterminal according to claim 30, wherein the first and second channel separation codes comprise respective different Walsh codes, respective different OFDM/OFDMA frequency assignment codes, respective different OFDM/OFDMA channel assignment codes, and/or respective different OFDM/OFDMA sub-channel assignment codes.

35. A radioterminal according to claim 30, wherein the first and second channel separation codes comprise respective first and second code phases of the same code.

36. A radioterminal according to claim 35, comprising a code generator configured to generate a code responsive to first and/or second identifiers for the radioterminal.

37. A radioterminal according to claim 30, wherein the radio transceiver uses the same chip rate when communicating with the SBC and the ATC, wherein the radio transceiver employs a symbol period when communicating with the SBC that is an integer multiple of a symbol period used when the radioterminal is communicating with the ATC, wherein the first channel separation code comprises a first spreading code having a first length, wherein the second channel separation code comprises a second spreading code having a second length, and wherein the first length is an integer multiple of the second length.

38. A radioterminal according to claim 30, wherein the first and/or second channel separation codes are functions of at least one radioterminal identifier.

39. A radioterminal according to claim 30, wherein the radioterminal is operative to generate and/or select a code responsive to at least one radioterminal identifier.

40. A radioterminal according to claim 30, wherein the radioterminal is configured to communicate with the ATC using a TDD air interface protocol and wherein the radioterminal is further configured to communicate with the SBC using a FDD air interface protocol.

41. A radioterminal according to claim 40, wherein the TDD and/or the FDD air interface protocol is an OFDM and/or an OFDMA air interface protocol.

42. A radioterminal according to claim 30, wherein the radioterminal communicates with the SBC using a first sub-band of a satellite service link frequency band, and wherein the radioterminal communicates with the ATC using a second sub-band of the satellite service link frequency band.

43. A space-based component (SBC) of a wireless communications system, the SBC configured to communicate with first radioterminals using first frequencies of a satellite frequency band, second frequencies of which are used by an ancillary terrestrial component (ATC) to communicate with second radioterminals using an OFDM/OFDMA air interface protocol, the SBC using a first set of channel separation codes to communicate with the first radioterminals that is different than a second set of channel separation codes used by the ATC to communicate with the second radioterminals.

44. An SBC according to claim 43, wherein the SBC is configured to communicate with radioterminals using a first air interface protocol that is different than a second air interface protocol used by the ATC.

45. An SBC according to claim 43, wherein the first and second sets of channel separation codes comprise respective sets of scrambling codes, respective sets of frequency assignment codes, respective sets of channel assignment codes, respective sets of sub-channel assignment codes and/or respective sets of spreading codes.

46. An SBC according to claim 43, wherein the first and second sets of channel separation codes comprise respective different sets of spreading codes, respective different sets of frequency assignment codes, respective different sets of channel assignment codes, and/or respective different sets of sub-channel assignment codes.

47. An SBC according to claim 43, wherein the first and second sets of channel separation codes comprise respective different sets of Walsh codes, respective different sets of OFDM/OFDMA frequency assignment codes, respective different sets of OFDM/OFDMA channel assignment codes and/or respective different sets of OFDM/OFDMA sub-channel assignment codes.

48. An SBC according to claim 43, wherein the first and second sets of channel separation codes comprise respective different first and second sets of code phases of the same code.

49. An SBC according to claim 48, wherein the first and/or second sets of code phases are functions of first and/or second radioterminal identifiers.

50. An SBC according to claim 43, wherein the first and second sets of channel separation codes comprise respective first and second sets of long codes, frequency, channel and/or sub-channel assignment codes and/or short codes.

51. An SBC according to claim 43, wherein the SBC and the ATC employ the same chip rate, wherein the SBC employs a symbol period that is an integer multiple of a symbol period used by the ATC, wherein the first set of channel separation codes comprises a first set of spreading codes having a first length, wherein the second set of channel separation codes comprises a second set of spreading codes having a second length, and wherein the first length is an integer multiple of the second length.

52. An SBC according to claim 43, wherein the first set of channel separation codes are functions of at least one radioterminal identifier.

53. An SBC according to claim 43, wherein the SBC is operative to generate the first set of channel separation codes responsive to at least one radioterminal identifier.

54. A method of operating a radioterminal, the method comprising:
   communicating with a space-based component (SBC) of a mobile satellite communications system using first frequencies of a satellite frequency band;
   communicating with an ancillary terrestrial component (ATC) of the mobile satellite communications system using second frequencies of the satellite frequency band and using an OFDM/OFDMA air interface protocol; and
   using respective different first and second channel separation codes to communicate with the SBC and the ATC.

55. A method according to claim 54 further comprising:
   communicating with the SBC using a first air interface protocol; and
   communicating with the ATC using a second air interface protocol that is different than the first air interface protocol.

56. A method according to claim 54, wherein the first and second channel separation codes comprise respective scrambling codes, respective frequency assignment codes, respective channel assignment codes, respective sub-channel assignment codes and/or respective spreading codes.

57. A method according to claim 54, wherein the first and second channel separation codes comprise respective different spreading codes, respective different frequency assignment codes, respective different channel assignment codes and/or respective different sub-channel assignment codes.

58. A method according to claim 54, wherein the first and second channel separation codes comprise respective different Walsh codes, respective different OFDM/OFDMA frequency assignment codes, respective different OFDM/

OFDMA channel assignment codes, and/or respective different OFDM/OFDMA sub-channel assignment codes.

59. A method according to claim 54, wherein the first and second channel separation codes comprise respective first and second code phases of the same code.

60. A method according to claim 59, further comprising: generating a code responsive to first and/or second identifiers for the radioterminal.

61. A method according to claim 54, further comprising:
using the same chip rate when communicating with the SBC and the ATC; and
employing a symbol period when communicating with the SBC that is an integer multiple of a symbol period used when communicating with the ATC;
wherein the first channel separation code comprises a first spreading code having a first length, wherein the second channel separation code comprises a second spreading code having a second length, and wherein the first length is an integer multiple of the second length.

62. A method according to claim 54, wherein the first and/or second channel separation codes are functions of at least one radioterminal identifier.

63. A method according to claim 54, further comprising:
generating and/or selecting a code responsive to at least one radioterminal identifier.

64. A method according to claim 54, further comprising:
communicating with the ATC using a TDD air interface protocol; and
communicating with the SBC using a FDD air interface protocol.

65. A method according to claim 64, wherein the TDD and/or the FDD air interface protocol is an OFDM and/or an OFDMA air interface protocol.

66. A method according to claim 54, further comprising:
communicating with the SBC using a first sub-band of a satellite service link frequency band; and
communicating with the ATC using a second sub-band of the satellite service link frequency band.

* * * * *